US012570922B2

(12) United States Patent
Staley et al.

(10) Patent No.: US 12,570,922 B2
(45) **Date of Patent: *Mar. 10, 2026**

(54) MULTIPLE CANDLE WICK ASSEMBLIES AND METHODS AND APPARATUS FOR MAKING THE SAME

(71) Applicant: FIL-TEC HOLDINGS, INC., Cavetown, MD (US)

(72) Inventors: Kyle R. Staley, Waynesboro, PA (US); Andrew L. Wallech, Falling Waters, WV (US); Lesa F. Bowers, Hagerstown, MD (US); Charles H. Rockwell, Boonsboro, MD (US); Amir Yaraghi, Fairplay, MD (US); Vincent E. Schoeck, Jr., Hagerstown, MD (US)

(73) Assignee: FIL-TEC HOLDINGS, INC., Cavetown, MD (US)

( * ) Notice: Subject to any disclaimer, the term of this patent is extended or adjusted under 35 U.S.C. 154(b) by 238 days.

This patent is subject to a terminal disclaimer.

(21) Appl. No.: 18/240,337

(22) Filed: Aug. 30, 2023

(65) Prior Publication Data

US 2024/0002747 A1 Jan. 4, 2024

Related U.S. Application Data

(60) Continuation of application No. 17/126,009, filed on Dec. 17, 2020, now Pat. No. 11,781,089, which is a (Continued)

(51) Int. Cl.

| | |
|---|---|
| ***C11C 5/00*** | (2006.01) |
| ***F21V 37/00*** | (2006.01) |

(Continued)

(52) U.S. Cl.

CPC ................ *C11C 5/006* (2013.01); *F23D 3/08* (2013.01); *F23D 3/16* (2013.01); *F23D 3/18* (2013.01);

(Continued)

(58) Field of Classification Search

CPC ... C11C 5/006; F23D 3/08; F23D 2900/03082

See application file for complete search history.

(56) References Cited

U.S. PATENT DOCUMENTS 15,821 A 9/1856 Sanders
120,105 A * 10/1871 Ryder ..................... C11C 5/002 431/288

(Continued)

FOREIGN PATENT DOCUMENTS

KR 200352940 6/2004

*Primary Examiner* — Jorge A Pereiro

(74) *Attorney, Agent, or Firm* — NIXON & VANDERHYE P.C.

(57) ABSTRACT

A multiple candle wick products are disclosed which include at least one pair of candle wicks each having a knit construction and defining a terminal end which is adapted to being burned in use and a ladder filament connecting the pair of candle wicks. The knit construction of the candle wicks is such that during burning each respective terminal end of the candle wicks curls outwardly opposite to one another relative to an elongate axis thereof.

15 Claims, 6 Drawing Sheets
(2 of 6 Drawing Sheet(s) Filed in Color)

Related U.S. Application Data division of application No. 15/985,991, filed on May 22, 2018, now Pat. No. 11,021,677.

(60) Provisional application No. 62/517,287, filed on Jun. 9, 2017.

(51) Int. Cl.

*F23D 3/08* (2006.01)
*F23D 3/16* (2006.01)
*F23D 3/18* (2006.01)

(52) U.S. Cl.

CPC ............. *C11C 5/008* (2013.01); *F21V 37/002* (2013.01); *F23D 2900/03082* (2013.01)

(56) References Cited

U.S. PATENT DOCUMENTS

| | | | | | |
|---|---|---|---|---|---|
| 243,272 | A | * | 6/1881 | Joly | C11C 5/002 431/288 |
| 343,567 | A | | 6/1886 | Clarke | |
| 530,170 | A | | 12/1894 | Haas et al. | |
| 1,496,837 | A | | 6/1924 | Atkins | |
| 1,671,267 | A | | 5/1928 | Atkins | |
| 1,974,037 | A | | 9/1934 | Atkins | |
| 2,001,377 | A | | 5/1935 | Candy, Jr. | |
| 2,074,693 | A | * | 3/1937 | Hooper | F21V 37/0025 139/415 |
| 2,210,290 | A | | 8/1940 | Heinsohn | |
| 2,302,146 | A | | 11/1942 | Root | |
| 2,310,019 | A | | 2/1943 | Hamblet | |
| 2,465,762 | A | | 3/1949 | Supplee | |
| 2,818,718 | A | | 1/1958 | Roberts | |
| 2,829,511 | A | * | 4/1958 | Frank | C11C 5/006 431/291 |
| 2,845,785 | A | | 8/1958 | Weglin | |
| 3,090,660 | A | | 5/1963 | Hoyer | |
| 3,582,251 | A | | 6/1971 | Concannon | |
| 4,468,147 | A | | 8/1984 | Manusch | |
| 4,497,187 | A | * | 2/1985 | Yamaguchi | D04B 21/20 66/196 |
| 4,555,231 | A | | 11/1985 | Kustka | |
| 4,735,568 | A | | 4/1988 | Izumisawa | |
| 5,124,200 | A | * | 6/1992 | Mallonee | D04H 1/76 428/137 |
| 5,439,376 | A | | 8/1995 | Kramer | |
| 5,501,750 | A | | 3/1996 | Smith | |
| D370,283 | S | | 5/1996 | Simon | |
| 5,863,196 | A | | 1/1999 | Rockwell | |
| D424,716 | S | | 5/2000 | Orlandi | |
| D425,218 | S | | 5/2000 | Orlandi | |
| D426,654 | S | | 6/2000 | Orlandi | |
| D427,336 | S | | 6/2000 | Orlandi | |
| 6,171,103 | B1 | | 1/2001 | Orlandi | |
| 6,203,313 | B1 | | 3/2001 | Holmes | |
| D449,371 | S | | 10/2001 | Bornstein | |
| 6,508,644 | B1 | | 1/2003 | Pesu | |
| 6,652,269 | B1 | | 11/2003 | Stenger | |
| 6,699,034 | B2 | | 3/2004 | Schoeck | |
| D676,186 | S | | 2/2013 | Ramaker | |
| D676,187 | S | | 2/2013 | Ramaker | |
| 9,816,053 | B2 | | 11/2017 | Delcotto | |
| 10,151,477 | B2 | | 12/2018 | Decker | |
| 10,472,742 | B1 | | 11/2019 | May | |
| 2003/0013060 | A1 | | 1/2003 | Schoeck | |
| 2003/0211437 | A1 | * | 11/2003 | Wilson | F23D 3/36 431/325 |
| 2006/0292509 | A1 | | 12/2006 | Reisman et al. | |
| 2009/0311854 | A1 | | 12/2009 | Tollens | |
| 2013/0095440 | A1 | | 4/2013 | Cagle et al. | |
| 2014/0162201 | A1 | | 6/2014 | Jewett | |
| 2017/0051441 | A1 | | 2/2017 | King | |
| 2017/0081607 | A1 | | 3/2017 | Schunk | |
| 2018/0355279 | A1 | | 12/2018 | Staley | |

* cited by examiner

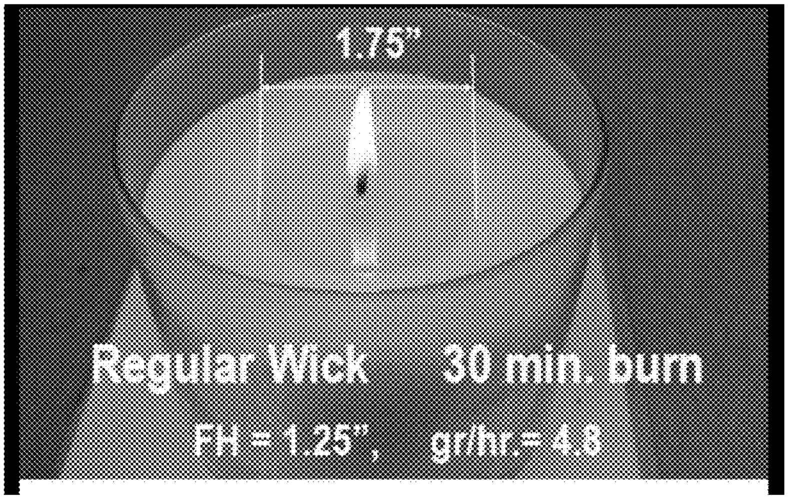
FIG. 6A (Prior Art)
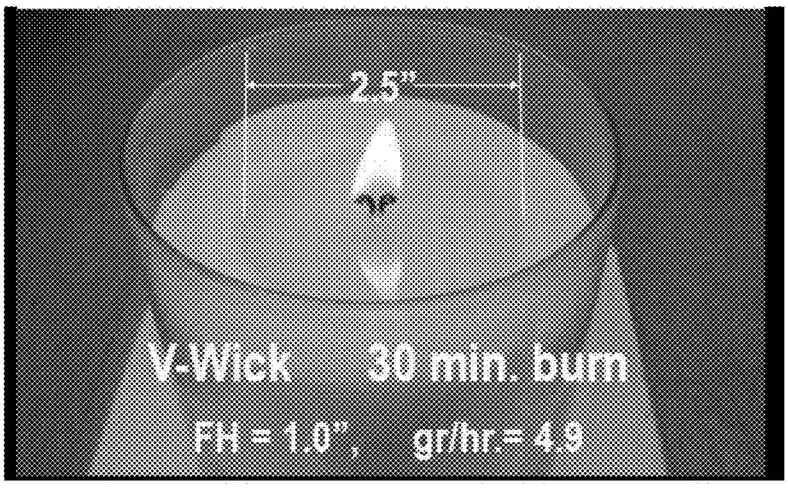
FIG. 6B (Invention)

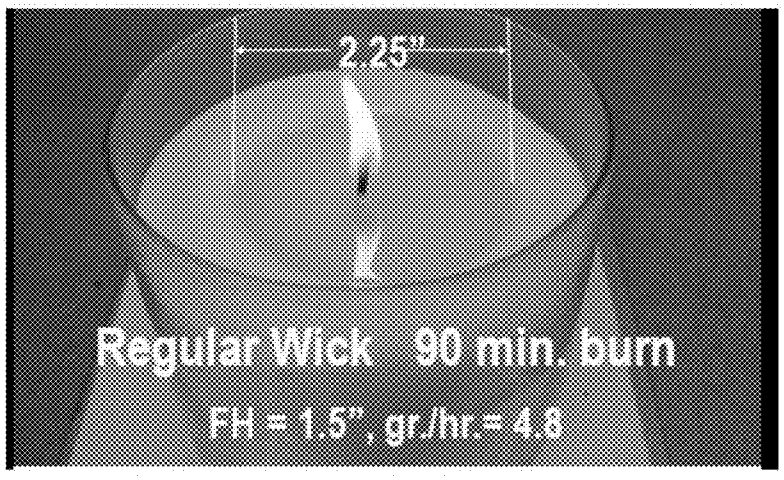
FIG. 6C (Prior Art)
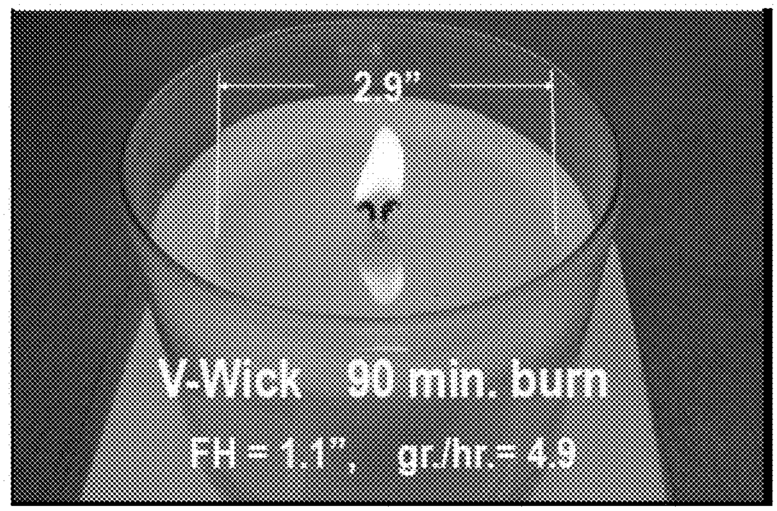
FIG. 6D (Invention)

MULTIPLE CANDLE WICK ASSEMBLIES AND METHODS AND APPARATUS FOR MAKING THE SAME

CROSS-REFERENCE TO RELATED APPLICATION

This application is a continuation of U.S. application Ser. No. 17/126,009 filed on Dec. 17, 2020 (now U.S. Pat. No. 11,781,089), which in turn is a divisional of U.S. Application Ser. No. 15/985,991 filed May 22, 2018 (now U.S. Pat. No. 11,021,677), which is based on and claims domestic priority benefits from U.S. Provisional Patent Application Ser. No. 62/517,287 filed on Jun. 9, 2017, the entire contents of each being expressly incorporated hereinto by reference.

FIELD

The embodiments disclosed herein relate generally to candle wicks and methods of making the same. More specifically, the embodiments disclosed herein relate to candle wick assemblies having multiple individual candle wicks that can be associated with a solid candle wax fuel as part of an integral wick system. When lit, the candle wick assemblies allow the multiple candle wicks to separate from one another so as to achieve a broader and shorter flame thereby in turn causing an expanded liquid wax pool to be formed on the surface of the candle.

BACKGROUND

Candles employing a wick have been in existence for many centuries. A typical candle has a single wick, or multitude of wicks, that extends longitudinally through the body of the candle. Single wicks are usually centrally disposed in the candle body. The combustible candle body is typically a thermoplastic blend of petroleum (paraffin) wax, mineral (montan) wax, synthetic wax (polyethylene or Fischer-Tropsch (FT) waxes) or natural waxes (vegetable or animal waxes). Clear candle waxes, known as gel candles, have diverse decorating potential. These gel candles are made from mineral oil and special resins. Natural, plant based soybean wax is gaining popularity as a cost competitive, environmental or "green" wax derived from renewable resources. Various additives used to modify the candle hardness, color, burn rate and aroma are well known in the trade and include, for example, stearic acid, UV inhibitors, polyethylene, scent oils and color pigments. Upon lighting a candle wick, the heat melts the wax which then travels up the wick by capillary action and is vaporized. Performance requirements of a wick in a candle include the ability to create and maintain the desired burn rate, the ability to create and maintain the desired wax pool and, if specified or required, the ability to bend or curl to maintain the proper wick height (referred to in the trade as "self-trimming"). In addition to these performance requirements, it is important that the finished wick be stable and not subject to size fluctuation when tension is applied to the wick during the candle making or wick pre-waxing process. The ability of the wick to be self-supporting may be preferred, or even required, in certain candle types or candle manufacturing processes, e.g., so-called poured candle constructions where the molten wax fuel is poured into a mold around a pre-positioned and pre-waxed wick and thereafter allowed to solidify.

One performance characteristic of scented candles that may be employed for environmental scent freshening or aroma therapy is the size of the liquid pool of wax fuel that forms on the top of the candle. In general, manufacturers of scented candles prefer to have a large liquid pool of wax fuel as this increases the scent released into the ambient environment. At the same time, however, flame height cannot be too high or the candle flame will then emit undesirable soot that can mar the appearance of the candle and candle holder and nearby surfaces, i.e., by visible smoke being emitted from the candle flame and being deposited as soot on the candle holder and into the environment and/or by the presence of undesirable black carbon droppings that are visible in the liquid wax pool. These carbon deposits, can cause secondary ignition, a safety hazard near the end of the candle life. A single conventional wick large enough to produce the necessary heat to form the desired size liquid wax pool often results in an unreasonably high flame, carbon deposits and excess sooting all of which are undesirable and some of which are unsafe.

It is known that providing multiple spaced-apart wicks will increase the size of the liquid wax pool while maintaining several smaller flames. However, increasing the number of wicks will in turn increase manufacturing costs (and hence increase the cost of the finished candle product) since multiple wick insertions must be made into the solid wax fuel during production. Additionally, conventional multiple wick candles produce a much less consistent burn environment within the candle. Having two or more independent flames causes considerable air turbulence which changes as the wax level in the candle container drops over time. This air turbulence within the candle container can cause the flame height to fluctuate significantly from under ¼ "to over 1.5" over the life of the candle.

It would therefore be highly desirable if a candle wick could be provided as a single wick assembly having multiple individual wicks that are capable of separating one from another when lit to thereby achieve an increased liquid wax pool size which is of substantially uniform diameter with a single stable and broader flame exhibiting decreased flame height comparable to conventional multiple wick candles, yet can be produced using single wick manufacturing techniques (i.e., since the multiple wicks are separably contained within a single wick assembly). It is towards fulfilling such needs that the embodiments disclosed herein are directed.

SUMMARY

In general, the embodiments disclosed herein provide multiple candle wicks that may be placed into a candle wax (paraffin) body utilizing conventional single candle wick manufacturing techniques. When lit, the multiple candle wicks as described herein will therefore provide for an increased wax pool diameter (thereby increasing the amount of liberated scents from the candle body) with lower flame height (and thereby decreased risk of sooting) at wax burn rates that are comparable to single candle wicks.

In some preferred embodiments, the multiple candle wicks as disclosed herein will include a wick construction having at least one pair of substantially parallel elongate candle wicks which are laterally separated from one another, and a ladder filament connecting the pair of candle wicks. The ladder filament extends back and forth between the candle wicks (e.g., at substantially 90° relative to the elongate axes of the wicks) so as to establish respective crossing portions that are spaced apart from one another along a lengthwise direction of the construction. The ladder filament is of sufficient flexural stiffness so as to resiliently bias the pair of candle wicks from a compacted position wherein the candle wicks are closely laterally spaced apart relative to one another and into a spread position wherein the candle wicks are further laterally spaced apart relative to one another following release of an applied bending force sufficient to cause the connecting portions to bend about a longitudinal axis of the construction. The ladder filament may be a thermoplastic monofilament, for example a monofilament formed of polyolefin (e.g., polypropylene), nylon, polyester or like thermoplastic materials.

Virtually any conventional candle wick may be employed in the embodiments disclosed herein. For example, the candle wicks may be formed of braided or knitted wick yarns of spun cotton or rayon. The candle wicks may include elongate stiffening elements along the longitudinal extent thereof so as to impart self-supporting characteristics to the candle wicks.

A wick assembly is also provided according to the embodiments disclosed herein wherein a wick construction as briefly described above is bent around an exterior circumferential portion of an elongate core element. The crossing portions of the ladder filament may therefore be resiliently bent so that the wick construction assumes a general U-shape around the exterior circumferential portion of the core element to place the candle wicks into the compacted position thereof. An external wax coating may be applied over the core element and the wick construction so as to maintain the candle wicks in the compacted position thereof. The core element may be provided with a core filament and a wax bonding layer on an exterior surface of the core filament.

The wick construction may be formed by providing at least one pair of parallel elongate candle wicks which are laterally separated from one another and connecting such candle wicks to one another with the ladder filament so the ladder filament extends back and forth between the candle wicks so as to establish respective crossing portions that are spaced apart from one another along a lengthwise direction of the construction. According to one embodiment, the wick yarns are knitted into respective candle wicks while simultaneously inserting the ladder filament into the knit structure as a throw yarn back and forth between the knit candle wicks during the knitting process. Alternatively, the wick yarns may be braided to form respective candle wicks, in which case the ladder filament may be stitched to the candle wicks in a back and forth manner. Alternatively, the wick yarns may be woven to form respective candle wicks, in which case the ladder filament may be woven into or stitched to the candle wicks in a back and forth manner.

The candle wick construction may be joined with the elongate core element to form the multiple candle wick assembly by bending the crossing portions of the ladder filament about an exterior circumferential portion of the core element so as to place the candle wicks into the compacted position thereof. The candle wicks are maintained in such compacted position by means of a suitable releasable connection with the core element. For example, such releasable connection may be in the form of a thermally releasable wax or thermoplastic adhesive that melts at the ignition temperature of the solid candle wax fuel. According to embodiments herein, a wax or thermoplastic coating may be applied onto such a structure by advancing the core element and the candle wick construction with the crossing portions of the ladder filament bent therearound to an applicator and applying the coating thereto so as to maintain the candle wicks in the compacted position thereof. Allowing the applied coating material to cool and harden therefore maintains the individual wicks in their compacted position with the crossing portions of the ladder filament bent around the circumferential portion of the core element.

The candle wick assembly may then be positioned in a body of conventional candle wax (paraffin). In this regard, one technique involves inserting the wick assembly into a pre-formed hole in a solid wax body. The candle wick assembly may be anchored to the wax body using a conventional metal anchor tab. Another technique that may be practiced includes positioning the wick assembly within a candle mold or container, pouring molten candle wax into the mold or container and allowing the wax to cool to thereby form the wax body and embed the wick assembly therein.

These and other aspects and advantages of the present invention will become more clear after careful consideration is given to the following detailed description of the preferred exemplary embodiments thereof.

BRIEF DESCRIPTION OF ACCOMPANYING DRAWINGS

A. Color Drawings

The patent or application file contains at least one drawing executed in color. Copies of this patent or patent application publication with color drawings will be provided by the Office upon request and payment of the necessary fee.

B. Drawing Descriptions

The disclosed embodiments of the present invention will be better and more completely understood by referring to the following detailed description of exemplary non-limiting illustrative embodiments in conjunction with the drawings of which:

FIGS. 6A-6D are color photographs showing a burning multiple candle wick in accordance with the embodiments disclosed herein in comparison to a single candle wick of the prior art as described further in the Example below.

DETAILED DESCRIPTION

A. Definitions

Figure 1:
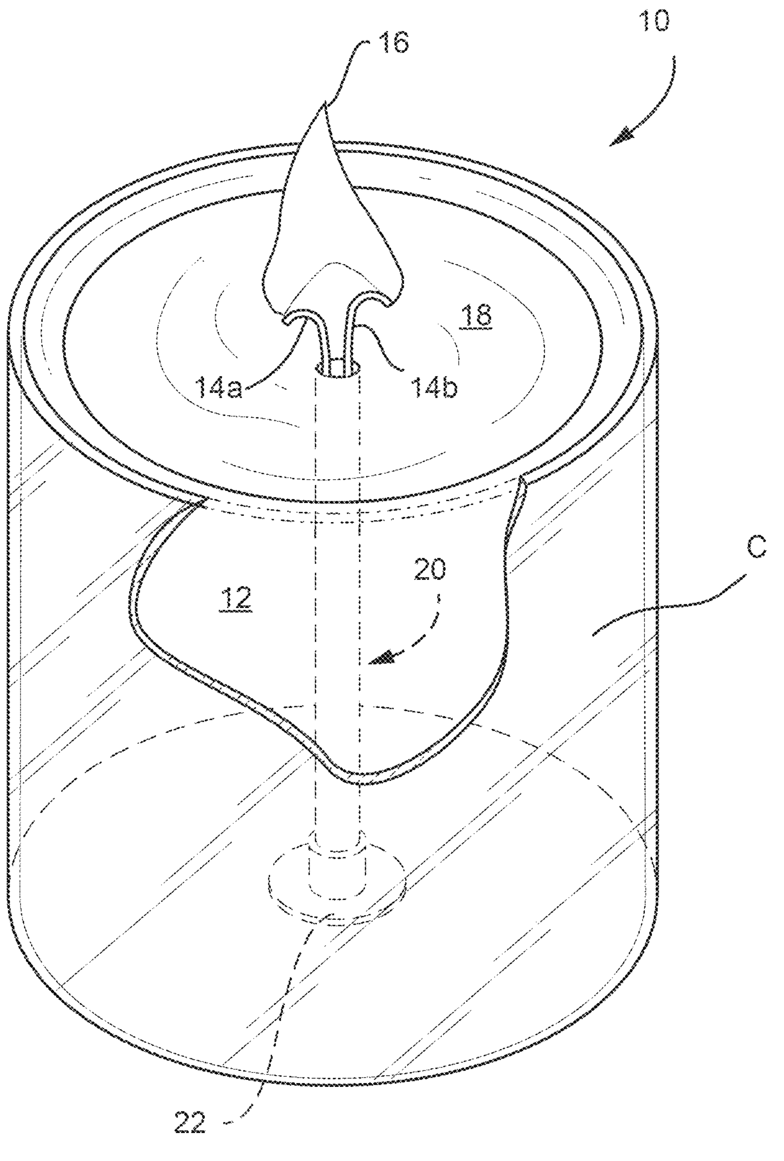
FIG. 1 is a perspective view of a burning candle which embodies a multiple candle wick assembly in accordance with an embodiment of the invention.

As used herein and in the accompanying claims, the terms below are intended to have the following definitions:

"Filament" means a fibrous strand of extreme or indefinite length.

"Fiber" means a fibrous strand of definite length, such as a staple fiber.

"Yarn" means a collection of numerous filaments or fibers which may or may not be textured, spun, twisted or laid together.

"Knit" or "knitted" refers to the forming of loops of yarn with the aid of thin, pointed needles or shafts. As new loops are formed, they are drawn through those previously shaped. This inter-looping and the continued formation of new loops produces a knit material.

"Braid" or "braided" refers to a relatively narrow textile band or cord formed by plaiting or intertwining three or more strands of yarn diagonally relative to the production axis of the band or cord so as to create a regular diagonal pattern down its length.

"Woven" means a fabric structure formed by weaving or interlacing warp-wise and weft-wise yarns or filaments of indefinite length at substantially right angles to one another.

"Warp-wise" and "weft-wise" denote the general orientations of yarns as being generally in the machine direction and cross-machine direction, respectively.

"Laid-in yarn" refers to the yarn or yarns that are laid-in with the warp yarns and do not form part of the fabric, e.g., do not form interlocking loops such that the warp yarns are knit around such laid-in yarns.

"Wick curl" is the arc from the top of the wax pool to the terminal end of the wick that is formed by the wick after it is burned in the candle, expressed in degrees. Preferably, the wicks as disclosed herein exhibit a wick curl having no more than about 90° (i.e., so that the terminal end of the wick does not extend substantially beyond a horizontal plane relative to a vertical axis of the candle in which the wick is formed).

"Self-trimming" is the regulation of the wick height and length, to an acceptable size so that it burns clean with little carbon build-up or smoking, by the candle burning process. A certain amount of "wick curl" is required for a wick to be "self-trimming".

"Self-supporting" refers to a property of a wick whereby a finite length of the wick remains generally oriented along the wick's elongate axis when held upright without lateral support.

"Stable wax pool" means a wax pool that has attained a maximum diameter which does not increase over time during candle burning.

"Uniform diameter wax pool" refers to a wax pool that has a substantially uniform circular diameter.

"Burn rate" is the amount of wax fuel, expressed by weight, consumed over a period of time, e.g. grams of wax fuel per hour (gm/hr).

"Flexural stiffness" or "bending stiffness" is the property of an elongate yarn or filament to bend under applied force with sufficient memory to return to its original elongate state. Yarns and fibers having relatively high flexural or bending stiffness will also typically possess a relatively high Young's modulus. Those fiber elements which require a relatively high flexural or bending stiffness will thus typically possess a Young's modulus of between about 0.5 to about 10 MPa, e.g., between about 0.5 to about 5.0 MPa or between about 1.0 to about 3.0 MPa.

B. Description of Preferred Exemplary Embodiments

Accompanying FIG. 1 depicts an exemplary burning candle which includes a body 12 formed of a solid, combustible candle wax material provided in a container C formed of any suitable material, e.g., glass, metal, ceramic or the like. The candle wax material forming the body 12 of the candle 10 is provided with dual wicks 14*a*, 14*b* in accordance with an embodiment of the present invention embedded therein. The flame 16 burning at the top end of the candle body 12 creates a generally circularly shaped (as viewed from above) molten wax pool 18 which serves as a reservoir of fuel to be supplied by the wick 14 to allow combustion to continue.

As is shown in FIG. 1, each of the wicks 14*a*, 14*b* exhibits a wick curl that is opposite to one another. That is, each of the terminal end portions of the wicks 14*a*, 14*b* is arced laterally relative to the wick's elongate axis $A_l$ so that a portion thereof extends generally at a right angle (e.g., about 90°) relative to the elongate axis $A_l$ (see FIG. 2). As a result, the terminal ends of the wicks 14*a*, 14*b* are generally positioned at the edge of the flame 16 thereby allowing the terminal end portion of the wicks 14*a*, 14*b* to themselves to be combusted. As can be appreciated, and as was discussed above, such controlled wick curl and wick combustion allows the wicks 14*a*, 14*b* to be self-trimming.

The wicks 14*a*, 14*b* are provided as part of a self-supporting wick assembly 20 which may be embedded in the wax body 12 of the candle 10. One advantage of the wick assembly 20 containing multiple wicks 14*a*, 14*b* is that it may be inserted into a conventional metal anchor tab 22 that is used by numerous manufacturers to anchor a single wick into the wax body of the candle.

Figure 3:
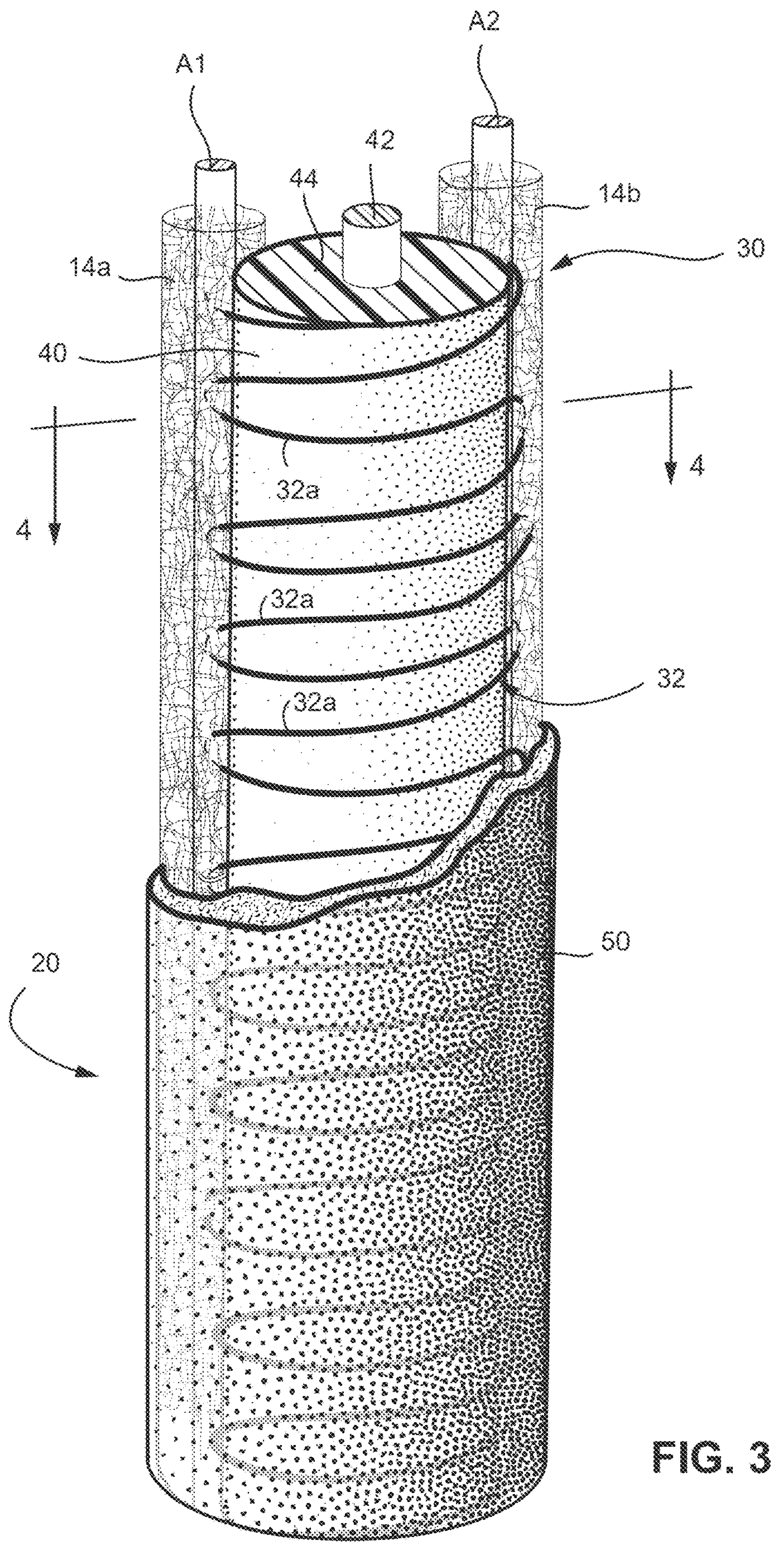
FIG. 3 is an enlarged schematic perspective view of a multiple (dual) candle wick construction in accordance with an embodiment of this invention.
Figure 4:
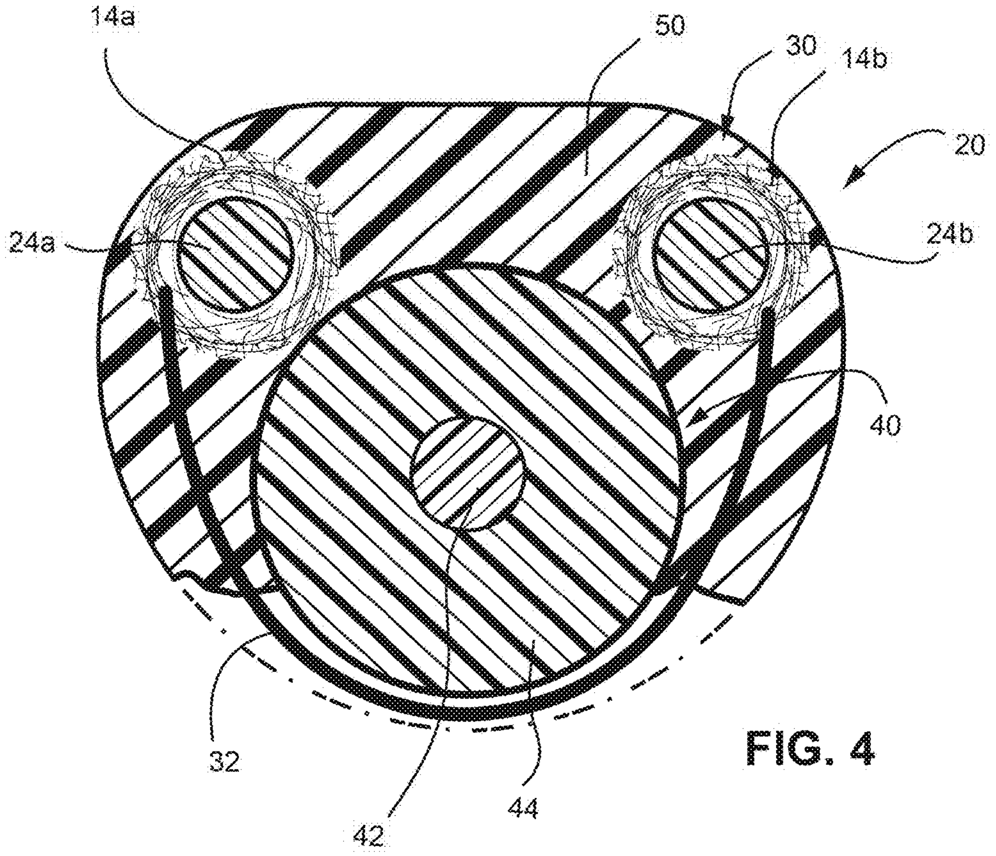
FIG. 4 is an enlarged schematic perspective view of the single wick assembly according to an embodiment of the invention which includes the multiple (dual) candle wick construction shown in FIG. 3.

As shown more specifically in FIG. 4, the wick assembly 20 is generally comprised of a multiple wick construction 30 as shown in FIG. 3 which is maintained in folded state about an elongate core element 40 by wax coating 50. The individual wicks 14*a*, 14*b* of the wick construction 30 are cross-connected to one another by a relatively stiff and thereby resilient ladder filament 32. In order to enhance the self-supporting characteristic of the individual wicks 14*a*, 14*b*, a stiffener filament 24*a*, 24*b* may be provided as part of the wick structure.

Each of the wicks 14*a*, 14*b* may be in the form of conventional braided, knit or woven yarns formed of conventional wick fibers, e.g., cotton, rayon, bamboo, linen, hemp and/or other cellulosic fibers. In one embodiment, the wicks 14*a*, 14*b* may be knit as described more fully in U.S. Pat. No. 6,699,034, the entire content of which is expressly incorporated hereinto by reference. Braided wicks that may be employed in the practice of this invention are also well known in the art as evidenced by U.S. Pat. Nos. 1,496,837, 1,671,267, and 5,124,200, the entire contents of each being expressly incorporated hereinto by reference.

If the wicks 14*a*, 14*b* are braided, then the ladder filament 32 may be stitched to each wick 14*a*, 14*b* in a zig-zag manner so as to join the wicks 14*a*, 14*b* together in a parallel spaced-apart manner with the ladder filament 32 extending therebetween as shown in FIG. 3. Alternatively, if the wicks 14*a*, 14*b* are in the form of a knit or woven structure, then the ladder filament 32 may be laid-in as part of the knitting or weaving process to form the dual wick construction 30 depicted in FIG. 3. In either case, the individual crossing portions 32*a* will preferably be substantially orthogonal (90°+/−) relative to the longitudinal axes A1, A2 of the wicks 14*a*, 14*b* as such an orientation will provide maximum bias resiliency to spread the wicks 14*a*, 14*b* apart when the upper end of the wick assembly 20 is lit.

As noted previously, the wicks 14*a*, 14*b* are formed of a conventional candle wick material, e.g., yarns comprised of cotton, rayon, linen, hemp, bamboo and/or other cellulosic fibers. The stiffener elements 24*a*, 24*b*, on the other hand may be a filament or yarn formed of any suitable synthetic or natural fibrous material provided it imparts the requisite stiffening properties to the wicks 14*a*, 14*b*. Thus, stiffener elements 24*a*, 25*b* having a flexural stiffness (Young's modulus) of between about 0.5 to about 10 MPa can satisfactorily be employed in the practice of the embodiments of this invention.

One suitable class of materials from which the stiffener elements 24*a*, 24*b* may be made include thermoplastics, e.g., polyolefins such as polypropylene or polyethylene, nylons, polyesters and the like. In some embodiments, the stiffener elements 24*a*, 24*b* are monofilaments of polypropylene as such a material provides the desired stiffness in order to promote self-supporting capabilities to the wicks 14*a*, 14*b* so as to be capable of extending upright along the axes A1, A2, respectively, without the aid of external support. In addition, the monofilaments forming the stiffener elements 24*a*, 24*b* will exhibit a required melting temperature of greater than the melt temperature of the wax body 12, e.g., greater than about 220° F. (105° C.). One preferred form of wick stiffener elements 24*a*, 24*b* can therefore be polypropylene monofilaments having a diameter from about 0.01 inch to about 0.05 inch.

The stiffener elements 24*a*, 24*b* may also be formed of a multifilamentary yarn of spun natural fibers, such as cotton or rayon, provided with a coating material to impart stiffness to the yarn. Suitable thermoplastic coating materials such as polyolefins, nylons, polyesters, polyurethanes and the like may be employed for the purpose of imparting stiffness to the natural fibers of the multifilamentary yarn so that the elements 24*a*, 24*b* will exhibit the desired flexural stiffness as discussed previously. A finished multifilamentary yarn of spun natural fibers coated with a suitable thermoplastic coating material can be between about 1400 to about 3600 denier.

As noted above, the stiffener elements 24*a*, 24*b* may be laid-in when forming the wicks 14*a*, 14*b* or stitched between the wicks 14*a*, 14*b* so as to be part of the wick structure.

Figure 2:
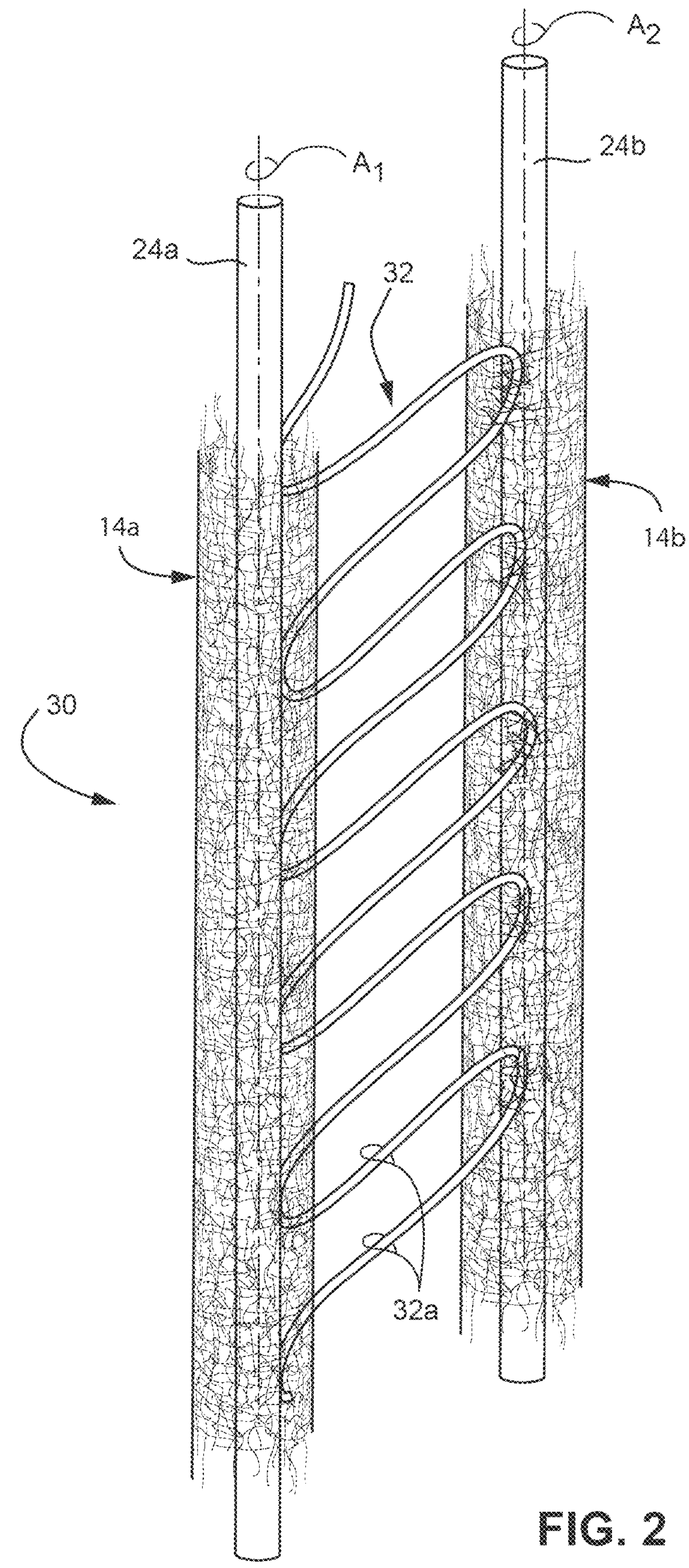
FIG. 2 is an enlarged cross-sectional elevational view of the multiple candle wick assembly that is employed in the candle depicted in FIG. 1.

Important to the embodiments disclosed herein, the wick construction 30 will be folded about the core element 40 so that the crossing portions 32*a* of ladder filament 32 are positioned about a circumferential portion of the exterior surface of the core element 40. As shown in FIG. 4, the wick construction 30 will thus assume a generally U-shaped configuration. When in such U-shaped configuration, the wicks 24*a*, 24*b* of the construction 30 will therefore be in a more compact arrangement relative to one another since the separation distance between the wicks 24*a*, 24*b* will be relatively closer (e.g., a separation distance therebetween which is not more than the diameter of the core element 40) as compared to the spread condition as shown in FIG. 2.

The ladder filament 32 must therefore possess sufficient flexural stiffness in order to achieve the required resiliency and exert spring bias force to spread the wicks 14*a*, 14*b* when folded about the core element 40. The ladder filament 32 may thus be similar to the stiffener elements 24*a*, 24*b* and thus may be formed of a thermoplastic polymer, e.g., polyolefins, such as polypropylene, nylons, polyesters and the like or thermoplastic coated multifilamentary yarns of spun natural fibers. In a preferred embodiment, the ladder filament is a polypropylene monofilament having a diameter of between about 0.004 inch to about inch, e.g., about 0.008 inch.

The core element 40 can be virtually any elongated filamentary element having sufficient structural integrity to allow the ladder filament 32 to be folded therearound. The core element 40 may therefore be virtually any filamentary or multi-fibrous element which includes spun yarns of staple fibers, multifilament bonded yarns or monofilaments made of thermoplastic materials. One such filament that may satisfactorily be employed in the embodiments disclosed herein as the core element 40 is a polypropylene monofilament having a diameter of between about 0.004 inch to about 0.016 inch, e.g., about 0.006 inch.

The core element 40 may optionally include a core filament 42 which is surrounded by a wax bonding layer 44. The wax bonding layer 44 serves to releasably bond the wicks 14*a*, 14*b* to the core element and thereby maintain the wick construction 30 folded in a U-shaped configuration therearound until the final wax coating 50 can be applied. The wax bonding layer 42 preferably has a melt temperature that is the same or less than temperature of the liquid wax pool 18, e.g., a melt temperature which is typically 220° F. (105° C.) or less.

As an alternative embodiment, the core element 40 may be formed entirely of a wax material, i.e., the core filament 42 may then be omitted. If made entirely of a wax material, the core element 40 may then serve the function of bonding the wicks 14*a*, 14*b* together in a compacted position (in which case the wax coating 50 may not necessarily be required for such purpose) while at the same time keeping the wicks 14*a*, 14*b* physically separated by virtue of the core element's diameter.

All of the thermoplastic components of the wick construction e.g., the stiffener elements 24*a*, 24*b*, the ladder filament 32 and the core element 40 will be consumed by the flame 16 thereby allowing the wicks 14*a*, 14*b* to curl outwardly as described above. Thus, all thermoplastic elements near the flame 16 will be consumed to thereby leave only the wicks 14*a*, 14*b* in contact with the liquid wax pool 18.

Figure 5:
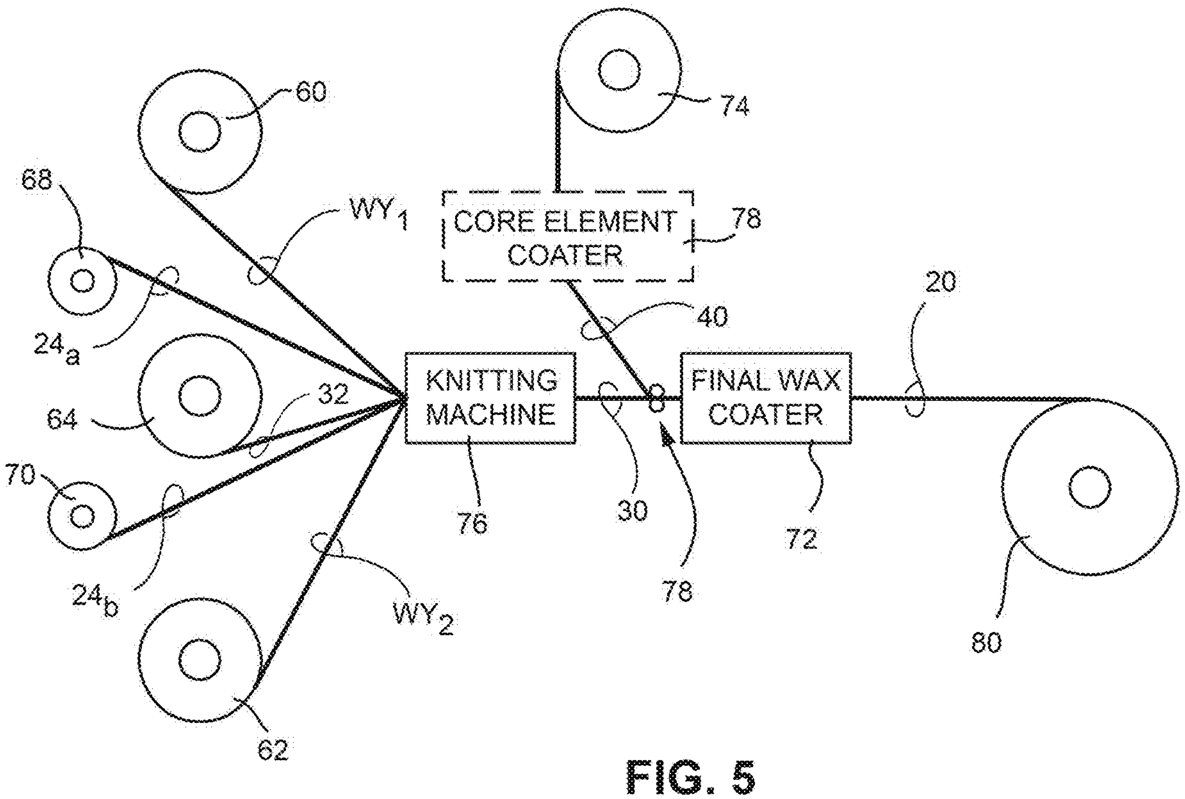
FIG. 5 is a schematic diagram of a manufacturing process for forming the single wick assembly as shown in FIG. 4.

A schematic diagram of a continuous manufacturing process to form the multiple wick construction 30 and the wick assembly 20 is depicted in accompanying FIG. 5. As shown, the process initially involves supplying wick yarns WY1 and WY2 from supply spools 60, 62, respectively, concurrently with a ladder filament 32 from a supply spool 64 thereof to a knitting machine 76. In addition, the stiffener filaments 24*a*, 24*b* are concurrently supplied to the knitting machine 76 from respective spools 68, 70, thereof. As noted previously, the wick yarns WY1 and WY2 may be spun yarns of cotton, rayon or other cellulosic fibers. Cotton yarns are preferred and will have a size that is dependent upon the size and/or style of the finished wick intended for a particular size and/or style of candle in which the wick is used. Cotton yarns may therefore vary greatly between, e.g., 60/1 to 8/2 ring spun or open spun cotton yarns. The knitting machine 76 thus forms a knitted construction to provide the wicks 14*a*, 14*b* in which the stiffener filaments 24*a*, 24*b* are laid-in. In addition, the knitting machine 76 knits the ladder filament 32 as a throw yarn back and forth between the wicks 14*a*, 14*b* to thereby form the wick construction 30.

The wick construction 30 may then be continuously passed on to the wax coater 72 simultaneously with the core element 40 being supplied to the coater 72 from a spool 74 thereof. The core element 40 is joined with the wick construction 30 at junction rollers 78 which are configured so as to fold the latter around the former before proceeding on to the wax coater 72. The core element 40 may optionally be passed through a core element coater 78 before being joined to the wick construction 30 so as to provide the core element 40 with the wax coating 44 as described previously. The wick assembly 20 thereby exits the coater 72 and is cooled to allow the exterior wax coating 50 to solidify (e.g., by either ambient air or by being passed through a cooling chamber) before being taken upon on a spool 80.

The process shown in FIG. 5 may be modified in various ways. For example, the process may be discontinuous such that the wick construction 30 is taken upon on an intermediate spool. The wick construction on such a take-up spool may then be transported to a final assembly location whereby the wick construction 30 is joined with the core element 40 and coated with the wax coating 50 to form the wick assembly Additionally or alternatively, the core element 40 may be pre-waxed when taken off its supply spool 74 and joined with the wick construction at the roller junction 76, in which case the core element coater 78 is not necessarily required. Furthermore, in the embodiment whereby the core element 40 may be formed entirely of a wax material, the core element 40 may be extruded in the form of a wax filament which is placed between the wick assembly 30 as it is folded by the rollers 78 prior to entering the final wax coater 72.

Other changes and modifications can be envisioned. In this regard, the assembly shown in FIG. 1 is depicted as being part of a so-called plug candle whereby the wick assembly 20 is inserted into a pre-formed hole in the solid wax body 12. In such a case, therefore, the wick assembly 20 will retain its structural characteristics along the lengthwise extent thereof but will allow the wicks 14*a*, 14*b* to separate as described previously at the upper terminal end when lit.

Alternatively, the wick assembly 20 may be provided as a self-supporting structure in a poured candle manufacturing process, i.e., a process whereby molten wax fuel is poured into a mold in which the wick assembly 20 is positioned. Contact between the molten wax and the wax coating 50 will thus cause the latter to melt and become a physical part of the wax fuel which in turn allows the wicks 14*a*, 14*b* to separate in the molten wax by virtue of the resilient spring force provided by the cross-connected ladder filament 32. The stiffener elements 24*a*, 24*b* will thus retain the self-supporting characteristics of the individual wicks 14*a*, 14*b* during such separation and will therefore retain the wicks 24*a*, 24*b* in an upright manner until the molten wax solidifies. A terminal end portion of the wick assembly 20 that was not contacted by the molten wax during the pouring operation will thus extend upwardly from the candle body and present itself as a single wick element. Upon being lit, however, the wax coating 50 will melt along with the other thermoplastic filament components to allow the wicks 14*a*, 14*b* to spread apart and thereby function as previously described.

EXAMPLES

A dual wick assembly in accordance with an embodiment of the invention described above (designated as "V-Wick") was prepared using the following components:

Wicks: Two knitted cotton yarns having an individual weight of 0.475 g/m and a combined weight of 0.95 g/m Stiffener element: 0.008" diameter polypropylene monofilament Ladder filament: 0.008" diameter polypropylene monofilament Core Element: 10/1 spun polypropylene yarn Coating Wax: 160° F. Melt Point paraffin wax The dual wick assembly ("V-wick") was placed in a glass container and a blend of molten paraffin and palm waxes with fragrance and colorant was poured around the wick and allowed to solidify. As a comparison, a conventional single candle wick (conventional knitted cotton wick having a weight of 1.74 g/m) was also coated with a 160° F. melt point paraffin wax which was then placed in an identical glass container and the identical wax blend poured around it to produce the same candle with different wicks. The comparative single candle wick was observed to produce the same consumption rate as the V-wick in accordance with an embodiment of the present invention, but produced higher flame and smaller melt pool. The comparative single candle wick tested also had two times the amount of cotton as did the V-wick in accordance with the embodiment of the invention.

The comparative single candle wick of the prior art and the dual V-wick assembly in accordance with an embodiment of the current invention were then trimmed to a wick height of about 0.25 inch and lit. The candles were allowed to burn and visually examined at 30 minutes and 90 minutes post-lighting to determine the wax pool diameter, the flame height and the wax burn rate. The results appear in the table below and are visually presented by FIGS. 6A-6D.

| | Single Wick (Prior Art) | V-Wick (Invention) | % Change (single wick to V-wick) |
|---|---|---|---|
| | Wax Pool Diameter (inches) | | |
| 30 min. burn | 1.75 | 2.5 | +42% |
| 90 min. burn | 2.25 | 2.9 | +29% |
| | Flame Height (inches) | | |
| 30 min. burn | 1.25 | 1.0 | −20% |
| 90 min. burn | 1.5 | 1.1 | −27% |
| | Wax Burn Rate (gr/hr.) | | |
| 30 min. burn | 4.8 | 4.9 | +2% |
| 90 min. burn | 4.8 | 4.9 | +2% |

The data from these tests showed that the dual wick assembly of an embodiment according to the present invention was able to increase the wax pool diameter with lower flame height (thereby lower risk of sooting) and a comparable wax burn rate as compared to conventional single wick of the prior art. Moreover, since the wick assembly is capable of being assembled with the candle wax using conventional single wick automated processing equipment, the candle manufacturer can realize considerable cost benefits in addition to performance benefits by the wick assembly of the embodiments described herein.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A multiple candle wick product comprising a wick assembly which comprises:

(i) at least one pair of candle wicks each having a knit construction and defining a terminal end thereof adapted to being burned in use; and (ii) a ladder filament connecting the pair of candle wicks, wherein the wick assembly is folded into a U-shaped configuration such that the at least one pair of candle wicks are in a spaced-apart parallel compacted condition relative to one another, and wherein during burning the at least one pair of candle wicks spread apart to assume a spread condition where the at least one pair of candle wicks are spaced-apart by a distance greater than the compacted condition thereof, and wherein the knit construction of the candle wicks is such that during burning each respective terminal end of the candle wicks curls outwardly opposite to one another relative to an elongate axis thereof.

2. The multiple candle wick product according to claim 1, wherein the ladder filament extends back and forth between the candle wicks so as to establish respective crossing portions that are spaced apart from one another along a lengthwise direction of the construction.

3. The multiple candle wick product according to claim 2, wherein the ladder filament is of sufficient flexural stiffness so as to resiliently bias the pair of candle wicks from the compacted condition and into the spread condition thereof.

4. The multiple candle wick product according to claim 1, wherein the crossing portions are substantially orthogonal to respective elongate axes of the candle wicks.

5. The multiple candle wick product according to claim 1, wherein the candle wicks include elongate stiffening elements to impart self-supporting characteristics to the candle wicks.

6. The multiple candle wick product according to claim 1, wherein the ladder filament is a thermoplastic monofilament.

7. The multiple candle wick product according to claim 5, wherein the stiffening elements are selected from the group consisting of thermoplastic monofilaments and spun yarns of natural fibers coated with a thermoplastic material.

8. The multiple candle wick product according to claim 6, wherein the wick yarns comprise fibers selected from the group consisting of spun cotton fibers, rayon fibers, hemp fibers, linen fibers, bamboo fibers and cellulosic fibers.

9. A candle which comprises a wax body and the multiple candle wick product according to claim 1 positioned in the wax body.

10. A method of making the multiple candle wick product according to claim 1, wherein the method comprises:

(a) providing the at least one pair of parallel elongate candle wicks having a knit construction which are laterally separated from one another; and (b) connecting the candle wicks to one another with the ladder filament by joining the ladder filament to the candle wicks in a back and forth between the candle wicks so as to establish respective crossing portions that are spaced apart from one another along a lengthwise direction of the multiple candle wick product.

11. The method according to claim 10, which comprises joining the ladder filament to the candle wicks so the crossing portions thereof are substantially orthogonal to respective elongate axes of the candle wicks.

12. The method according to claim 10, which further comprises inserting an elongate stiffening element into the candle wicks to impart self-supporting characteristics thereto.

13. The method according to claim 12, wherein the stiffening element is selected from the group consisting of thermoplastic monofilaments and spun yarns of natural fibers coated with a thermoplastic material.

14. The method according to claim 10, wherein the ladder filament is a thermoplastic monofilament.

15. The method according to claim 10, wherein the candle wicks are formed of wick yarns selected from the group consisting of spun cotton yarns, rayon yarns and cellulosic fiber yarns.

* * * * *